(12) United States Patent
Beall et al.

(10) Patent No.: US 6,214,437 B1
(45) Date of Patent: Apr. 10, 2001

(54) LOW-EXPANSION CORDIERITE HONEYCOMB BODIES AND METHOD

(75) Inventors: Douglas M. Beall, Painted Post; Gregory A. Merkel, Big Flats, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/199,024

(22) Filed: Nov. 24, 1998

Related U.S. Application Data
(60) Provisional application No. 60/067,246, filed on Dec. 2, 1997.

(51) Int. Cl.$^7$ .............................. B32B 3/12; B29C 47/00
(52) U.S. Cl. .............................. 428/116; 264/60; 264/61
(58) Field of Search .............................. 428/116; 264/60, 264/61, 56

(56) References Cited

U.S. PATENT DOCUMENTS

| | | | |
|---|---|---|---|
| 3,885,977 | * 5/1975 | Lachman et al. ........................ | 106/62 |
| 3,958,058 | * 5/1976 | Elmer .................... | 428/220 |
| 4,280,845 | * 7/1981 | Matsuhisa et al. ..................... | 106/62 |
| 4,434,117 | 2/1984 | Inoguchi et al. . | |
| 4,772,580 | 9/1988 | Hamanaka et al. . | |
| 4,869,944 | * 9/1989 | Harada et al. ........................ | 428/116 |
| 4,877,670 | 10/1989 | Hamanaka . | |
| 5,030,398 | * 7/1991 | Hamanaka et al. ..................... | 264/63 |
| 5,030,592 | 7/1991 | Komarneni et al. . | |
| 5,258,150 | 11/1993 | Merkel et al. . | |
| 5,332,703 | 7/1994 | Hickman . | |
| 5,409,870 | * 4/1995 | Locker et al. ........................ | 501/119 |

FOREIGN PATENT DOCUMENTS

| | | |
|---|---|---|
| 0 201 319 | 11/1986 | (EP) . |
| 0 232 621 | 5/1990 | (EP) . |
| 1 518 475 | 7/1978 | (GB) . |

* cited by examiner

Primary Examiner—Francis J. Lorin
(74) Attorney, Agent, or Firm—Kees van der Sterre

(57) ABSTRACT

Cordierite honeycomb bodies having low coefficients of thermal expansion (CTE) and correspondingly high resistance to thermal shock, and a method for making them, wherein an alumina-yielding raw material having high specific surface area and which disperses into very fine particles in the batch, preferably together with fine talc as the sole batch source of magnesium, are disclosed; the use of fine talc enables the production of thin-walled extruded honeycomb structures exhibiting both low average CTE and high porosity, a combination particularly desirable for applications such as catalytic substrates for the control of combustion engine exhaust emissions.

10 Claims, 2 Drawing Sheets

— Runs 1-3  ··□·· Runs 4-6  —■— Runs 7-9

—■— Runs 10-13  —•—  Runs 24-27
··□·· Runs 18-20  ---○--- Runs 32-33

—■— Runs 14-17          --●-- Runs 28-31
··□·· Runs 21-23         ---○--- Runs 34-35

LOW-EXPANSION CORDIERITE HONEYCOMB BODIES AND METHOD

This application claims the benefit of U.S. Provisional Application No. 60/067,246, filed Dec. 2, 1997, entitled LOW-EXPANSION CORDIERITE HONEYCOMB BODIES AND METHOD, by Douglas M. Beall and Gregory A. Merkel.

BACKGROUND OF THE INVENTION

The present invention relates to a method of producing a ceramic honeycomb body with low CTE ($<7 \times 10^{-7}$° $C.^{-1}$ from 25°–800° C.) which imparts high thermal shock resistance to the body. The method centers on the use of a finely dispersible, high surface area alumina-yielding source as a raw material in the batch mixture. The invention is especially useful for thin walled honeycomb substrates since it allows for the use of a fine talc source while maintaining a high degree of thermal shock resistance in the fired body.

Many different approaches to the use of alumina and talc in cordierite ceramic product formulations are known. British Patent Specification Number 1,518,475 and U.S. Pat. No. 4,280,845, for example, demonstrated that a cordierite ceramic having a satisfactory thermal expansion coefficient is obtained when the average particle size of the magnesium-containing raw material (specifically talc) is within the range of 5–150 micrometers, preferably 21–100 micrometers, and more preferably, 26–80 micrometers. It is shown that when the average particle size of the magnesium-containing raw material is outside this range, the thermal expansion coefficient over the range of 25–1000° C. is greater than $16 \times 10^{-7}$° $C.^{-1}$, resulting in poor thermal shock resistance.

U.S. Pat. No. 4,434,117 describes a method of producing a cordierite honeycomb body with a low coefficient of thermal expansion where the average talc particle size is as low as 2.8 micrometers. However, this method requires the "pre-firing" or calcination of the talc particles. Without this pre-firing step, it was found that the thermal expansion coefficient was unacceptably high when the average talc particle size was less than about 20 micrometers.

U.S. Pat. No. 4,772,580 and European Patent Number 0,232,621 both describe a method to obtain a low expansion cordierite honeycomb body using very fine talc particles (<7 micrometers). The method relies on the use of very fine clay in conjunction with the fine talc. It is specified that the average particle size of the clay particles can be no more than 2 micrometers, and the ratio of clay particle size to talc particle size can be no more than ⅓. The resulting ceramic product has a low level of porosity (<30%). Although low levels of porosity result in higher strength, it is known that high levels of porosity are most desirable for excellent coatability with a high surface area washcoat and catalyst.

In U.S. Pat. Nos. 4,772,580, 4,869,944, 5,030,398, 5,409,870 and European Patent Number 0,232,621, at least one material selected from the group consisting of alumina particles and aluminum hydroxide particles having an average particle size not greater than 2 micrometers is added to the batch for the low coefficient of thermal expansion. The aluminum hydroxide referred to in these patents is aluminum tri-hydrate, showing a 34% ignition weight loss on firing. Aluminum tri-hydrate typically has a relatively low surface area (<10 $m^2/g$), compared to boehmite (alpha aluminum monohydrate) which typically has a very high surface area (>50 $m^2/g$).

In Japanese published patent publication No. 256965/86, a cordierite honeycomb with a high thermal shock resistance is reportedly obtained by using α-alumina as a batch constituent, where the particle size distribution of the α-alumina is adjusted so that the particles with diameter less than 3 micrometers are not more than 17% of the distribution by weight, and the median diameter is between 4 and 17 micrometers. Fine α-alumina and intermediate phases such as χ-, κ-, γ-, δ-, θ-alumina etc. are considered highly reactive with respect to magnesium-containing raw material at a relatively low temperature (<1300° C.), being thought to hinder the main reaction with the talc and kaolin for producing the low thermal expansion cordierite.

In U.S. Pat. No. 5,030,592, a process for the manufacture of high density cordierite by the sol-gel process is described. In this patent, an alumina sol is used, along with magnesium and silicon oxide sols, to form a gel which is then dried and fired to form a cordierite body. Boehmite is used as one alumina source, although effects of its substitution for other aluminas in sol-based systems was not noted.

In U.S. Pat. No. 5,258,150, the use of boehmite is included under the category of aluminum oxide-yielding components (aluminum oxy-hydrate) in a method for the fabrication of a low thermal expansion, high porosity body. However, no recognition of the beneficial effects of aluminum mono-hydrate or other finely dispersible aluminum-yielding source with very high surface area is expressed.

In U.S. Pat. No. 5,332,703, a method for producing a low porosity, high strength cordierite body with low thermal expansion coefficient is described. In this patent, a composition consisting of a mineral component (talc, clay, alumina), is mixed with a chemical component (powdered oxides, hydroxides, and hydrous oxides of magnesium, silicon, and aluminum). However, no trends linking increases in the chemical component with decreases in thermal expansion were observed.

SUMMARY OF THE INVENTION

In accordance with the present invention, the use of reactive aluminas as batch constituents results in a lower coefficient of thermal expansion than compositions where α-alumina with low specific surface areas are used, provided that the high surface area $Al_2O_3$-forming source also disperses into fine particles. Thus the invention comprises the discovery that the use of a finely dispersible, high-surface area alumina-yielding source in the batch mixture lowers the thermal expansion relative to the same raw materials mixture where the alumina-yielding component has a low surface area or does not disperse into very fine particles.

By high surface area is meant a B.E.T. specific surface area of at least 20 $m^2/g$, and preferably greater than 50 $m^2/g$. By alumina-yielding source is meant aluminum oxide or a compound containing aluminum which when heated to sufficiently high temperature yields essentially 100% aluminum oxide. Especially preferred are alpha aluminum oxide hydroxide (AlOOH·$xH_2O$, commonly referred to as boehmite or pseudoboehmite, or as aluminum monohydrate) and the so-called transition aluminas (chi, eta, rho, iota, kappa, gamma, delta, and theta alumina) which contain various amounts of chemically bound water or hydroxyl. By finely dispersible is meant that the agglomerates of the alumina-yielding source are capable of being substantially broken down during the mixing and green forming processing steps into particles whose mean diameter is less than about 0.3 micrometers. The finely dispersible, high surface area alumina-yielding source may optionally be added to the raw material mixture as a pre-dispersed colloidal suspension in water or other liquid medium.

Through the use of the invention, significant reductions in average coefficients of thermal expansion (CTE) in cordierite honeycomb ceramics may be achieved. Thus the present invention provides a method of producing cordierite honeycomb bodies having a very low CTE ($<7.0 \times 10^{-7}$ °C.$^{-1}$ and preferably $<4.0 \times 10^{-7}$ °C.$^{-1}$). CTE values as low as $0.4 \times 10^{-7}$ °C.$^{-1}$ have been realized (measured from 25°–800° C.). These ultra-low thermal expansion values give these bodies a very high degree of thermal shock resistance.

DESCRIPTION OF THE DRAWINGS

The invention may be further understood by reference to the drawings, wherein each of FIGS. 1–3 illustrates the beneficial effects on average thermal expansion coefficient of batch additions of fine, highly dispersible alumina source materials.

DETAILED DESCRIPTION

Figure 1:
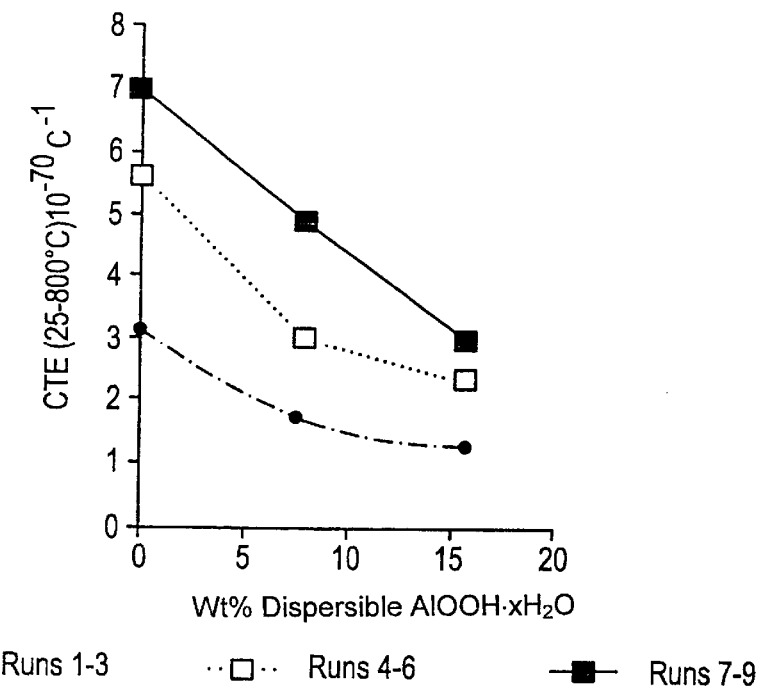

Commonly, alumina-yielding sources such as alpha-alumina ($Al_2O_3$) and aluminum tri-hydrate ($Al(OH)_3$) having specific surface-area values from about 0.2–10.0 $m^2/g$ have been used as batch constituents in the production of cordierite honeycomb bodies. Low thermal expansion coefficients ($<5.0 \times 10^{-7}$ °C.$^{-1}$) are possible using these alpha aluminas, but in combination with certain other raw materials, low thermal expansions have not been realized. For example, it is known to those skilled in the art that the particle size of the talc batch constituent must be of an optimum size in order to achieve a body with low coefficient of thermal expansion.

The use of talcs with particle distributions much finer than the optimum size result in bodies with high values of thermal expansion, resulting in poor thermal shock resistance. In the present study, it has been discovered that the use of fine talc can yield a cordierite body with a low coefficient of thermal expansion when a finely dispersible, alumina-yielding source with high surface area is substituted for some or all of an alumina-yielding source which has a low surface area or which does not disperse to a fine particle size.

Further, the present invention allows the use of fine talc without a pre-firing step, and perhaps without strict control of the clay particle size. In addition, a range of porosity values are possible, while maintaining a low coefficient of thermal expansion. Methods of producing cordierite based upon fine talc may be especially suitable for the manufacture of thin-walled honeycomb ceramic bodies where the use of a coarse talc could result in plugging of the die slots. In addition, fine talc is useful in bodies where fast firing is desirable. The increased reactivity leads to decreased sintering times.

The following Tables present examples illustrating that the CTE of cordierite ceramics is lowered by the partial or complete replacement of alpha-alumina with a finely dispersible, very high surface area $Al_2O_3$-forming source in the raw material mixture. Examples of raw materials useful in varying amounts for the production of cordierite ceramics in accordance with the invention, along with other raw materials used in the prior art, are reported in Table I below. Included in Table I where determined for selected materials are mean particle sizes (P.S.) as determined by Sedigraph analysis, and surface areas (S.A.) as determined by nitrogen B.E.T. analysis. For the commercial materials reported in Table I, talcs A and B are available from Luzenac, Inc. of Oakville, Ontario, Canada, and talc C is from Barretts Minerals, Inc., Dillon, Mont. The kaolin clays are produced by Dry Branch Kaolin, Inc. of Dry Branch, Ga. Boehrite materials K, L, M, and O are commercially available from CONDEA Vista Company of Houston, Tex., and boehihite N is from LaRoche Industries Inc. of Baton Rouge, La.

TABLE I

RAW MATERIALS

| Raw material | Material Code | Commercial Product | Mean P.S. (Tm) | B.E.T. S.A. ($m^2/g$) |
|---|---|---|---|---|
| Talc | A | Arctic Mist talc | 1.6 | |
| | B | Jetfil 500 talc | 3.4 | |
| | C | 96-67 talc | 6.1 | |
| MgO | D | | 0.8 | |
| $Mg(OH)_2$ | E | | 6.5 | |
| Kaolin clay | F | K10 clay | 0.9 | |
| | G | MP clay | 7.4 | |
| Calcined Kaolin | H | Glomax LL clay | 1.6 | |
| Alpha Alumina | I | A16 alumina | 0.4 | 9.4 |
| | J | APA-02 alumina | 3.4 | 42 |
| Boehmite | K | Dispal boehmite | 0.12 | 180 |
| | L | Catapal A boehmite | 55 | 270 |
| | M | Catapal D boehmite | 60 | 250 |
| | N | Versal 850 boehmite | 13 | 290 |
| | O | Disperal boehmite | 35 | 160 |
| Gamma Alumina | P | APA 100RDX alumina | 2.9 | 77 |
| | | SCFa-140 alumina | 30 | 145 |
| Silica | Q | Imsil A25 silica | 4.6 | |

To prepare cordierite ceramics from combinations of raw materials such as reported in Table I, the raw materials are mixed with 3% to 6% methyl cellulose as a binder and 25 to 45% water, and extruded as 2.5 cm diameter honeycomb bodies having cell densities (in cell/$cm^2$ of honeycomb cross-section) in the range of about 30 to 65 cells/$cm^2$. The extruded bodies are then dried in an oven at 95° C. for 48 hours, followed by firing in electric kilns on one of two different firing schedules (9.5 hours or 37 hours), those schedules being reported in Table II below.

TABLE II

Firing Schedules

| Schedule | Start Temperature (° C.) | End Temperature (° C.) | Duration (hours) | Rate (° C./hr) |
|---|---|---|---|---|
| Schedule A | 25 | 400 | 0.625 | 600 |
| (9.5 hours) | 400 | 550 | 1.50 | 100 |
| | 550 | 750 | 0.333 | 600 |
| | 750 | 840 | 0.90 | 100 |
| | 840 | 900 | 1.20 | 50 |
| | 900 | 950 | 0.50 | 100 |
| | 950 | 1150 | 1.60 | 125 |
| | 1150 | 1275 | 0.50 | 250 |
| | 1275 | 1410 | 0.675 | 200 |
| | 1410 | 1410 | 1.7 | Soak |
| | 1410 | 25 | 10.0 | −139 |
| Schedule B | 25 | 50 | 2 | 13 |
| (37 hours) | 50 | 450 | 5.5 | 73 |
| | 450 | 650 | 6 | 33 |
| | 650 | 900 | 2.25 | 111 |
| | 900 | 1050 | 2.25 | 67 |
| | 1050 | 1200 | 3.75 | 40 |
| | 1200 | 1400 | 7.25 | 28 |
| | 1400 | 1405 | 1.5 | 3 |
| | 1405 | 1405 | 6 | Soak |
| | 1405 | 850 | 6 | −93 |
| | 850 | 25 | 5 | −165 |

Illustrative examples of ceramic honeycombs prepared as above described are reported in Table III below. These include examples within the scope of the invention, as well as comparative examples outside of the scope thereof. Each of the comparative composition examples is indicated by a composition number with a C-suffix.

Included in the Table for each of the composition examples reported are identifications of the raw materials employed, as selected from Table I, and proportions of those materials incorporated in each example, in parts by weight of the dry powder honeycomb batch. The remainder of the batch weight will consist of binder, lubricant, and water used to form each powders mixture into an extrudable batch, which are removed from the composition during firing of the honeycombs.

In the case of the calcined kaolin fraction of these batches, some of the kaolins the H(1) and H(2) clays, were analyzed to determine the proportion of mullite loped during calcination; these contained 10.6% and 18.5% mullite by weight, actively. The H(3) kaolins were not analyzed.

TABLE III

Composition Examples

| Comp No. | Talc A | Talc B | Talc C | Kaolin clay F | Kaolin clay G | Calcined Kaolin H(1) | Calcined Kaolin H(2) | Calcined Kaolin H(3) | alpha Alumina I | Boehmite K |
|---|---|---|---|---|---|---|---|---|---|---|
| 1C  |      |      | 40.9 | 12.8 |     |      |      | 32.6 | 13.7 | 0.0  |
| 2   |      |      | 40.4 | 12.7 |     |      |      | 32.2 | 6.8  | 8.0  |
| 3   |      |      | 39.9 | 12.5 |     |      |      | 31.8 | 0.0  | 15.8 |
| 4C  |      | 40.9 |      | 12.8 |     |      |      | 32.6 | 13.7 | 0.0  |
| 5   |      | 40.4 |      | 12.7 |     |      |      | 32.2 | 6.8  | 8.0  |
| 6   |      | 39.9 |      | 12.5 |     |      |      | 31.8 | 0.0  | 15.8 |
| 7C  | 40.9 |      |      | 12.8 |     |      |      | 32.6 | 13.7 | 0.0  |
| 8   | 40.4 |      |      | 12.7 |     |      |      | 32.2 | 6.8  | 8.0  |
| 9   | 39.9 |      |      | 12.5 |     |      |      | 31.8 | 0.0  | 15.8 |
| 10C | 41.5 |      |      | 14.5 |     | 30.1 |      |      | 13.9 | 0.0  |
| 11  | 40.9 |      |      | 14.3 |     | 29.6 |      |      | 8.2  | 7.0  |
| 12  | 40.6 |      |      | 14.2 |     | 29.4 |      |      | 5.5  | 10.4 |
| 13  | 40.3 |      |      | 14.1 |     | 29.2 |      |      | 2.7  | 13.7 |
| 14  | 41.3 |      |      | 7.4  |     | 36.0 |      |      | 8.3  | 7.0  |
| 15  | 41.0 |      |      | 7.3  |     | 35.7 |      |      | 5.5  | 10.5 |
| 16  | 40.7 |      |      | 7.3  |     | 35.4 |      |      | 2.7  | 13.9 |
| 17C | 41.5 |      |      | 14.5 |     |      | 30.1 |      | 13.9 | 0.0  |
| 18  | 40.8 |      |      | 14.2 |     |      | 29.5 |      | 6.8  | 8.7  |
| 19  | 40.4 |      |      | 14.1 |     |      | 29.2 |      | 3.4  | 12.9 |
| 20  | 40.0 |      |      | 14.0 |     |      | 29.0 |      | 0.0  | 17.1 |
| 21C | 41.5 |      |      |      | 14.5 |     | 30.1 |      | 13.9 | 0.0  |
| 22  | 40.0 |      |      |      | 14.0 |     | 29.0 |      | 0.0  | 17.1 |

Representative properties of honeycomb ceramics provided in accordance with the invention are reported in Table 4 below. Included in Table 4 are products based on several of the compositions reported in Table II (Comp. No.), when fired according to one of the schedules in Table III. Reported where measured on individual samples is a mean value for the coefficient of thermal expansion of the honeycomb as measured over the temperature range 25–800° C., as well as a porosity value in percent and a mean pore diameter in micrometers for the fired material.

TABLE IV

Properties of Fired Honeycombs

| Run No. | Comp. No. | Firing Sched. | CTE ($10^{-7}$/° C.) | Porosity (%) | Pore. Diam. ($\mu$m) |
|---|---|---|---|---|---|
| 1  | 1C  | B | 3.1 |      |     |
| 2  | 2   | B | 1.7 |      |     |
| 3  | 3   | B | 1.3 |      |     |
| 4  | 4C  | B | 5.6 |      |     |
| 5  | 5   | B | 3.0 |      |     |
| 6  | 6   | B | 2.3 |      |     |
| 7  | 7C  | B | 7.0 |      |     |
| 8  | 8   | B | 4.9 |      |     |
| 9  | 9   | B | 3.0 |      |     |
| 10 | 10C | B | 6.8 | 35.0 | 1.5 |
| 11 | 11  | B | 5.4 | 28.5 | 1.3 |
| 12 | 12  | B | 4.7 | 25.0 | 1.2 |
| 13 | 13  | B | 3.8 | 26.3 | 1.1 |
| 14 | 10C | A | 5.5 | 37.4 | 2.7 |
| 15 | 11  | A | 3.9 | 26.5 | 1.8 |
| 16 | 12  | A | 2.0 | 22.3 | 1.6 |
| 17 | 13  | A | 0.4 | 20.7 | 1.6 |
| 18 | 14  | B | 5.5 | 30.9 | 1.4 |
| 19 | 15  | B | 4.3 | 27.6 | 1.3 |
| 20 | 16  | B | 3.9 | 23.0 | 1.1 |
| 21 | 14  | A | 3.8 | 29.0 | 2.1 |
| 22 | 15  | A | 1.7 | 27.1 | 2.0 |
| 23 | 16  | A | 1.1 | 25.2 | 1.7 |
| 24 | 17C | B | 8.8 | 36.1 | 1.5 |
| 25 | 18  | B | 7.3 | 26.7 | 1.2 |
| 26 | 19  | B | 5.5 | 20.4 | 1.1 |
| 27 | 20  | B | 3.8 | 20.0 | 0.9 |
| 28 | 17C | A | 8.2 | 35.3 | 2.1 |
| 29 | 18  | A | 7.0 | 25.3 | 1.4 |

TABLE IV-continued

Properties of Fired Honeycombs

| Run No. | Comp. No. | Firing Sched. | CTE ($10^{-7}/°$ C.) | Porosity (%) | Pore. Diam. ($\mu$m) |
|---|---|---|---|---|---|
| 30 | 19 | A | 3.7 | 20.2 | 1.3 |
| 31 | 20 | A | 2.2 | 17.5 | 1.2 |
| 32 | 21C | B | 10.2 | 36.8 | 1.6 |
| 33 | 22 | B | 5.3 | 20.8 | 1.1 |
| 34 | 21C | A | 11.1 | 38.3 | 2.3 |
| 35 | 22 | A | 3.2 | 15.2 | 1.2 |

As is evident from the data in Table IV, each progressive replacement of an alpha alumina with a dispersible, finely particulate (0.12 micrometers), high surface area (180 m$^2$/g) boehmite can result in a significant reduction in thermal expansion in the fired honeycomb. This is true even where the alpha alumina replaced is of relatively small particle size (0.4 micrometer); Runs 1–9 are illustrative. Such alumina replacements can be effective at levels as low as about 5% of the solids (inorganic powder) component of the cordierite batch, depending in part on the selection of other batch components, and can range up to total replacement of the batch alumina with boehmite.

The advantageous CTE reductions provided by the invention are obtained over a relatively wide range of talc particle sizes, ranging from about 6 micrometers (Runs 1–3) down to 3.5 micrometers (Runs 4–6) and even down to 1.6 micrometers average size for the talc particles(Runs 7–9). An illustration of the CTE changes observed for these runs is provided in FIG. 1 of the drawing. The results in the case of the finer talcs (below about 4 micrometers average particle size) are particularly advantageous since the latter are preferred materials for the production of thin-wall ceramic honeycombs, yet can easily increase CTE values above commercially acceptable levels unless some control strategy is used.

The invention also enables the production of low expansion honeycombs based on fine talcs plus alumina batches which exhibit relatively high total porosity and mean pore diameter. These characteristics are difficult to achieve in fine talc bodies, yet highly desirable for honeycomb substrates for automobile engine emissions control catalyst supports. Commercial catalysts for auto exhaust emissions control are customarily applied via fluid catalyst washcoats, and such washcoats are more efficiently applied when the substrate surface is highly porous.

Figure 2:
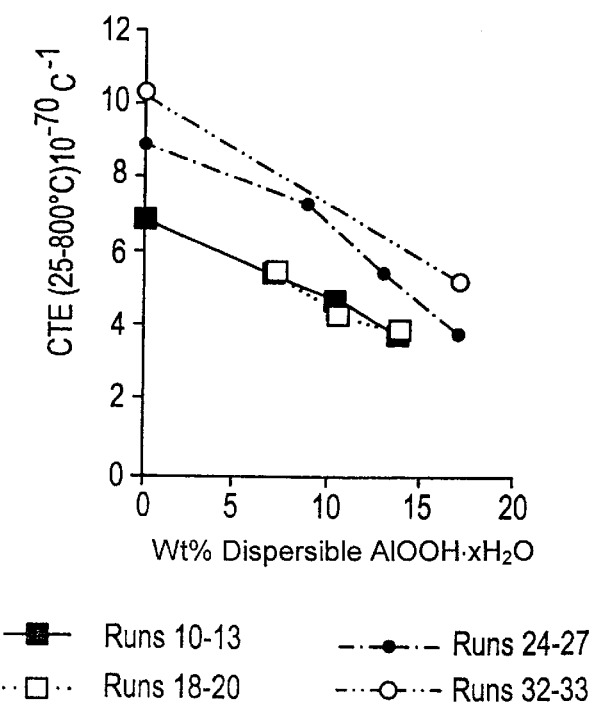

Among the relatively high porosity honeycombs (above about 20% total porosity, more preferably above 25%), the trend toward lower CTE values with the substitution of dispersible fine alumina into the batch does not appear to be affected by the nature of the particular kaolin clays or clay combinations selected, or by the length of the firing schedule employed. Thus, for example, utilizing a conventional 37 hour firing schedule, similar reductions can be observed in mixed clay compositions comprising 30% calcined kaolin clay (Runs 10–13), as much as 35% calcined kaolin (Runs 18–20), 30% calcined kaolin of relatively low mullite content (Runs 24–27), and a similar proportion of low-mullite calcined kaolin combined with a stacked kaolin clay (Runs 32 and 33). The trends toward lower CTE with increasing fine dispersible alumina content are illustrated in FIG. 2 of the drawing.

Similar results are obtainable with shorter firing treatments as well. Runs 14–17 utilize the batch mixtures of Runs 10–13 to provide low expansion honeycomb products on the 9.5 hour firing schedule of Table II, while Runs 21–23 utilize the batches of Runs 18–20. In both cases the trend toward lower CTE with higher boehmite content is evident.

Figure 3:
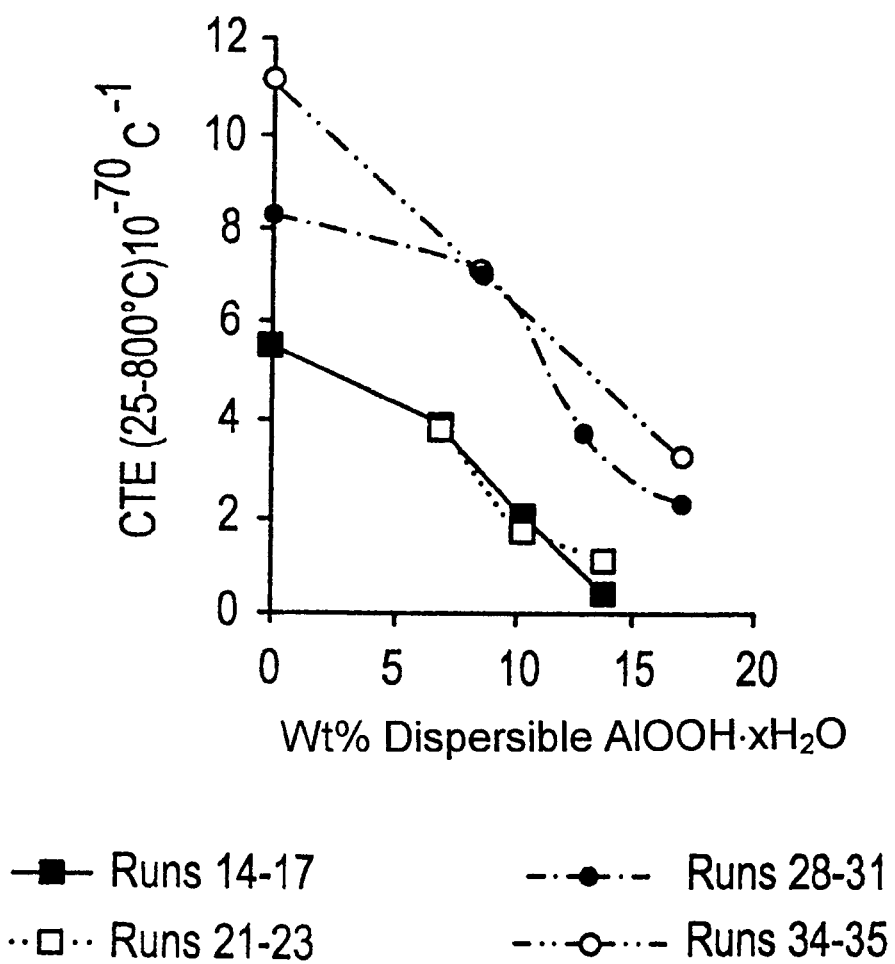

Similar results are seen in Runs 28–31 and Runs 34–35, corresponding to Runs 24–27 and 32–33, respectively, but using the shorter firing schedule. The trend toward lower CTE values with increasing fine alumina remains, although at the highest alumina substitution levels the wall porosity values observed may not be as high as with the longer firing schedules. FIG. 3 of the drawing plots the reductions in CTE observed during each of these shorter firing runs with increasing proportions of boehmite-sourced alumina used.

The use of a dispersible high-surface-area alumina with a very fine dispersed particle size is a critical aspect of the invention; high-surface-area aluminas alone are ineffective if they cannot be dispersed to a fine particle size. For example, substitution of an alpha alumina having a surface area of 42 m$^2$/g and a mean particle size of 3.4 micrometers for the 9 m$^2$/g surface area alumina of Composition No. 1 results in a CTE increase to $5.1 \times 10^{-7}°$ C.$^{-1}$, rather than the CTE decrease obtained with the boehmite substitution.

Experimental data further suggest that the use of a dispersible alumina having a dispersed particle size greater than about 0.3 micrometers can adversely affect CTE and therefore thermal shock properties. Thus, for example, the use of one of the relatively large-particle boehmite alumina compositions L, M, N or O from Table I, in place of the finer boehmite alumina K, produces extruded fired cordierite products with CTE values in the $7-12 \times 10^{-7}°$ C.$^{-1}$ range, rather than in the $2-4 \times 10^{-7}°$ C.$^{-1}$ range seen when the finer alumina is used. This result is attributed to the development of higher levels of spinel and/or mullite in the higher-expansion fired products, perhaps attributable to incomplete reaction of the alumina with other batch constituents.

It is important in formulating batches for the production of cordierite ceramics in accordance with the invention to avoid the use of certain conventional batch components which appear to interact unfavorably with the clays employed. One problem is magnesium oxide (MgO) and its source materials, e.g., MgO, Mg(OH)$_2$, and MgCO$_3$. When these are included alone or in combination with crystalline silica in partial replacement of talc in the extrusion batch, extruded cordierite honeycombs substantially higher in CTE than honeycombs from batches containing only fine talc as the magnesium source are produced.

Except in cases where kaolin and calcined kaolin are substantially excluded from the batch, typical extruded products centered on cordierite-forming batch compositions containing powdered MgO or its precursors will have CTE values in the range of $10-18 \times 10^{-7}°$ C.$^{-1}$ over the 25–800° C. range. This is well above the maximum average expansion value of about $7 \times 10^{-7}°$ C.$^{-1}$, and preferred average expansion range of about $0.4-5 \times 10^{-7}°$ C.$^{-1}$, which are typical of products provided in accordance with the invention.

We claim:

1. A method for making an extruded fired cordierite ceramic honeycomb having an having an average linear coefficient of thermal expansion (25–800° C.) below $7 \times 10^{-7}/°$ C. which comprises the steps of:
    (a) compounding and plasticizing a cordierite-forming clay-talc powder batch comprising an amount of high-surface-area, finely dispersible alumina at least effective to reduce the value of the thermal expansion coefficient of the article below the value in the absence of the alumina;

(b) forming the plasticized powder batch into a green honeycomb by extrusion through a honeycomb extrusion die; and (c) firing the green honeycomb to a temperature and for a time effective to convert the powder batch to crystalline cordierite.

2. An extruded fired cordierite ceramic article having an average linear coefficient of thermal expansion (25–800° C.) below $7\times10^{-7}$/° C. produced from a clay-talc mineral batch wherein the talc has a particle size below 7 micrometers and at least 5% of the total weight of inorganic powders present in the batch comprises an alumina powder (i) having a B.E.T. specific surface area of at least about 20 $m^2/g$, and (ii) capable of forming alumina particles with a mean diameter of less than about 0.3 micrometers during batch processing.

3. An extruded fired cordierite ceramic article in accordance with claim 2 having an average linear coefficient of thermal expansion (25–800° C.) below $4\times10^{-7}$/° C.

4. An extruded fired cordierite ceramic article in accordance with claim 2 having a total porosity above 20%.

5. A method in accordance with claim 1 wherein the high-surface-area, finely dispersible alumina comprises at least 5% by weight of all inorganic powders present in the clay-talc powder batch.

6. A method in accordance with claim 5 wherein the high-surface-area, finely dispersible alumina has a B.E.T. specific surface area of at least about 20 $m^2/g$ and is capable of forming alumina particles with a mean diameter of less than about 0.3 micrometers during the compounding and plasticizing of the batch.

7. A method in accordance with claim 6 wherein the honeycomb has an average linear coefficient of thermal expansion (25–800° C.) below $4\times10^{-7}$/° C.

8. A method in accordance with claim 6 wherein the talc present in the clay-talc powder batch has a particle size below 7 micrometers.

9. A method in accordance with claim 6 wherein the high-surface-area, finely dispersible alumina is an alpha aluminum oxide hydroxide (AlOOH·xH$_2$O) powder.

10. A method in accordance with claim 8 wherein the talc has an average particle size not exceeding 6.1 micrometers.

* * * * *

UNITED STATES PATENT AND TRADEMARK OFFICE
CERTIFICATE OF CORRECTION

PATENT NO.    : 6,214,437 B1
DATED         : April 10, 2001
INVENTOR(S)   : Beall et al.

It is certified that error appears in the above-identified patent and that said Letters Patent is hereby corrected as shown below:

Column 10,
Line 16, "with claim 6" should be -- with claim 5 --.

Signed and Sealed this

Twenty-third Day of July, 2002

Attest:

JAMES E. ROGAN
Attesting Officer                Director of the United States Patent and Trademark Office